United States Patent
Sahagian

(10) Patent No.: US 7,584,115 B2
(45) Date of Patent: Sep. 1, 2009

(54) SYSTEM FOR AUTOMATED CONTROL AND REPORTING OF SALES PROCESSES

(75) Inventor: David Victor Sahagian, Needham, MA (US)

(73) Assignee: Rightnow Technologies, Inc., Bozeman, MT (US)

( * ) Notice: Subject to any disclaimer, the term of this patent is extended or adjusted under 35 U.S.C. 154(b) by 1466 days.

(21) Appl. No.: 10/024,966

(22) Filed: Dec. 19, 2001

(65) Prior Publication Data
US 2005/0131710 A1  Jun. 16, 2005

(51) Int. Cl.
*G06F 17/30* (2006.01)

(52) U.S. Cl. .......................... 705/10; 705/11

(58) Field of Classification Search .................. None
See application file for complete search history.

(56) References Cited

U.S. PATENT DOCUMENTS

| | | | | |
|---|---|---|---|---|
| 6,067,525 | A * | 5/2000 | Johnson et al. | 705/10 |
| 7,216,087 | B2 * | 5/2007 | Thompson et al. | 705/10 |
| 7,228,284 | B1 * | 6/2007 | Vaillancourt et al. | 705/10 |
| 7,340,410 | B1 * | 3/2008 | Vaillancourt et al. | 705/10 |
| 7,516,088 | B2 * | 4/2009 | Johnson et al. | 705/16 |
| 2002/0040358 | A1 * | 4/2002 | Ikezawa et al. | 707/1 |
| 2002/0072954 | A1 * | 6/2002 | Sales | 705/10 |
| 2002/0077998 | A1 * | 6/2002 | Andrews et al. | 707/1 |
| 2002/0082892 | A1 * | 6/2002 | Raffel et al. | 705/8 |
| 2003/0018508 | A1 * | 1/2003 | Schwanke | 705/9 |
| 2003/0078788 | A1 * | 4/2003 | Sussman et al. | 705/1 |

OTHER PUBLICATIONS

"OracleSalesOnline.com Continues Rapid Pace of Customer Adoption," PR Newswire, Oct. 25, 2000, 2 pgs.*
"SalesLogix Announces Record Fourth-Quarter and Year-End Financial Results," PR Newswire, Jan. 27, 2000, 8 pgs.*
Wheatley, M. "Selling IT to Salesmen," Management Today, Mar. 1998, p. 72-75 (3 pages).*
Bolcer, G. A. and Tayler, R. N. "Advanced Workflow Management Technologies," Software Process Improvement and Practice, vol. 4, 1998, pp. 125-171 (47 pgs).*

* cited by examiner

*Primary Examiner*—Albert DeCady
*Assistant Examiner*—Dave Robertson
(74) *Attorney, Agent, or Firm*—Husch Blackwell Sanders LLP

(57) ABSTRACT

The present invention provides a system for sales process creation and tracking. The system uses a database for storing information about processes, steps, results, autotasks, deals and deal tracking. An authorized user can create or modify processes. The processes are used to determine and report on the steps completed or to be completed with respect to any deal. The system also records information with respect to the success or failure of the process and the corresponding reasons.

9 Claims, 20 Drawing Sheets

Fig. 4D

Salesnet - Microsoft Internet Explorer

? Edit Result
Step 1: Qualify

*Result Name: [Already asked to buy]

Navigation: ● Go to Step [ ] [Step 6: Fill out win/loss report (won) ▶]
○ Mark Deal as Finished Deal Outcome: ☑ Mark the Deal as Won
☐ Mark the Deal as Lost Time Interval: [1] [Weeks] ☑ Allow User to Modify Due Date
(From this Step's Completion Date until the next Step's Due Date)

Next Step Owner: ● Owner of the Current Deal Step
○ Owner of the Deal
○ Allow User to Delegate the Next Step Owner ○ Save and Add Another Result
● Save and Return to Process Builder (Delete) (Save) (Cancel)

Fig. 4G

⑦ Setup : Won/Lost Reason Codes

Reasons for Won Deals

| | | Reason | Status |
|---|---|---|---|
| Edit | Del | Faster | Active |
| Edit | Del | Smarter | Active |
| Edit | Del | Stronger | Active |

Add

Reasons for Lost Deals

| | | Reason | Status |
|---|---|---|---|
| Edit | Del | Decided not to commit at this time | Active |
| Edit | Del | Went with competitor | Active |

Add

Fig. 4H

⑦ Setup : Activity Types and Purposes

Activity Types

| | | Types | Status |
|---|---|---|---|
| Edit | Del | Email | Active |
| Edit | Del | Fax | Active |
| Edit | Del | Letter | Active |
| Edit | Del | Phone Call | Active |

Add

Activity Purposes

| | | Purposes | Status |
|---|---|---|---|
| Edit | Del | Qualify | Active |
| Edit | Del | Whatever | Active |

Add

Salesnet - Microsoft Internet Explorer

ACCOUNTS | CONTA...

El Coloso Deal (#01)

Process: Inbound Call
Primary Contact: Jacob Abb...

Current Step Detail
- Step Name: Close Deal
- Step Due: 02/14/200...
- Step Notes:

Deal History

| | | Completed |
|---|---|---|
| edit | undo | 02/07/200... The demo we... |
| edit | undo | 01/31/200... Will give dem... |
| edit | undo | 01/24/200... |
| edit | undo | 01/17/200... |

---

740

Complete Current Step — 741

Deal: El Coloso Deal (#01) ( This Deal is Open )
Current Step: Close Deal   Current Step Owner: O'Connell, Diane
Step Completion Date: 02/15/2001
Step Result: Won Deal ▼ — 742
Notes:

Next Step Detail — 745

Next Step: Fill out win/loss report (won)
Due Date of Next Step: 02/22/2001   Owner of Next Step: O'Connell, Diane
                                     Probability of Winning: 100 % ▼

The Deal Outcome will be 'Won'
Select one or more reasons, if applicable: Faster / Smarter / Stronger ( Save )  ( Cancel )

El Coloso Deal (#01) (This Deal is Open)

Process: Inbound Call
Primary Contact: Jacob Abbo, 507-271-0555

Current Step Detail

Step Name: Close Deal
Step Due: 02/14/2001
Step Notes:

Undo Confirmation

This will make Close Deal the current step. Any information you logged for this step will be deleted.

OK    Cancel

Deal History

| | | Completed | Step | | | Deal Outcome |
|---|---|---|---|---|---|---|
| edit | undo | 02/15/2001 | Close Deal | Won Deal | O'Connell, Diane | Won |
| edit | undo | 02/07/2001 | Give Demo | Gave demo - interested | O'Connell, Diane | 50% |
| | | | | The demo went well. I was informed that a decision should be made by next week. | | |
| edit | undo | 01/31/2001 | Contact Prospect | Phoned - set up demo | O'Connell, Diane | 0% |
| | | | | Will give demo to 5 decision-makers at their offices | | |
| edit | undo | 01/24/2001 | Contact Prospect | Phoned - left message | O'Connell, Diane | 0% |
| edit | undo | 01/17/2001 | Qualify | Qualified | O'Connell, Diane | 10% |

Hide Notes

Fig. 6D

SYSTEM FOR AUTOMATED CONTROL AND REPORTING OF SALES PROCESSES

BACKGROUND OF THE INVENTION

1. Field of the Invention

The present invention relates to systems for tracking and reporting of sales processes. More particularly, it relates to an automated system for developing processes and tracking use of the processes.

2. Discussion of Related Art

As sales organizations have grown, it has become increasingly difficult to monitor the activities of individual salespeople. It has also become increasingly difficult for salespeople to provide meaningful reporting of the status of potential sales and ongoing sales activities. Therefore, a need exists for a system that permits accurate reporting of sales activities and the status of deals for meaningful analysis.

Furthermore, often there are known procedures that have proven successful over time for selling certain kinds of products within a company. New or less experienced people need guidance with respect to these procedures. Extensive training programs are not an effective use of resources for providing such information. Cumbersome training and procedural manuals are difficult to use and the appropriate process cannot always be located. Therefore, a need exists for a real-time system that provides guidance for individual steps of a process.

A system by Salesnet, Inc., called Process Builder 2, provided many of the features lacking in prior systems. The Process Builder 2 system was a computerized system designed to allow for creation of processes by administrators, and use by sales people. The system tracked the performance of the defined processes for multiple deals. The system had a web based, remote access design in which the software and data was stored at a central location. The administrators and users would access the system remotely through a network, such as the Internet. Process Builder 2 included a basic relational database which included entries for processes, steps, results, deals and tracking of deals. Each process was defined by a set of ordered steps. Each step had a set of possible results corresponding to that step. The results identified the next step in the process. The administrator could create a process by creating steps and results corresponding to that process.

A user would create a deal by entering basic information regarding the deal and identifying a process applicable to that deal. The user was then provided with the list of steps in the identified process and an indication of the current step. As the user completed each step, he or she would select the appropriate result. If the result did not end the deal, the next step in the process would be identified as the current step. Data would also be collected about the steps taken for each deal. The time and result of each step was recorded.

An administrator could use the Process Builder 2 system for generating different reports based upon the stored data. In particular, the status of all deals, across all users or for a selected user, could be determined. The steps taken by various users could also be determined. Furthermore, the data could be manipulated to determine various statistics regarding user performance, individually or in the aggregate.

Despite the many advantages of the automated Process Builder 2 system, it still lacked many features that would permit useful reporting of process information. In particular, Process Builder 2 was a sequential system, wherein each step of a process had to be performed in order within a deal. The possible results of each step were limited, since they could only result in repeating a step, going to the next step, and terminating the deal. Significant data about a deal were not recorded and could not be reported. For example, in Process Builder 2, the a probability of winning a deal could be associated with a step, but only by the process owner at the time of creation. Variations in probabilities at the time of performance could not be recorded. Also, deals were limited to a single user, which does not correspond to the team sales approach in many businesses. Processes, and corresponding steps and results, were also limited to specific owners, which limited the ability of others to correct or change the process. Furthermore, the Process Builder 2 system was static; processes could not be changed when there were any deals that had already begun using the process, so a new process had to be created. Therefore, a need remained for a system that provided efficient and useful automation of sales processes and data reporting.

SUMMARY OF THE INVENTION

The present invention overcomes in great part the deficiencies of the prior art by providing a system with a relational database for creating and following sales processes. The relational database includes information relating to processes, steps, results, autotasks, deals and deal tracking. In particular, the present invention provides a system with flexible processes, steps and results. According to one aspect of the present invention, step results define a next step, but not necessarily a sequential step in the process. A process step result may pass a user to a previous step, or skip steps in the process. According to another aspect of the present invention, the system provides a flexible ownership and access interface. Multiple people may be authorized to input or change information relating to a process or specific deal, as necessary. Furthermore, according to another aspect of the invention, the system allows specific ownership of individual steps within each deal, to better reflect a process with multiple team participants. According to another aspect of the invention, the system captures information about the status of the deal, such as the probability of winning the deal, as steps are completed. The system allows individual determinations of probability of winning a deal by the user. Furthermore, in order to maintain realistic expectations, different process steps can have limits placed on the probabilities by the process creator. According to another aspect of the invention, the system provides the ability to record information regarding deal performance. When certain results occur, the system allows or requires supplemental information, such as the reason for winning or losing the deal, to be entered and captured. According to another aspect of the invention, the system includes various activities which may occur in performing a single step. According to another aspect of the invention, the process can be modified even though some deals may already be using it and may currently be at various steps. Finally, according to another aspect of the invention, information regarding activities can be captured by the system.

BRIEF DESCRIPTION OF THE DRAWINGS

FIGS. 4A-4K illustrate a user interface for creating and modifying a process according to an embodiment of the present invention.

FIGS. 6A-6D illustrate a user interface for tracking a deal using a process according to an embodiment of the present invention.

DETAILED DESCRIPTION

Figure 1:
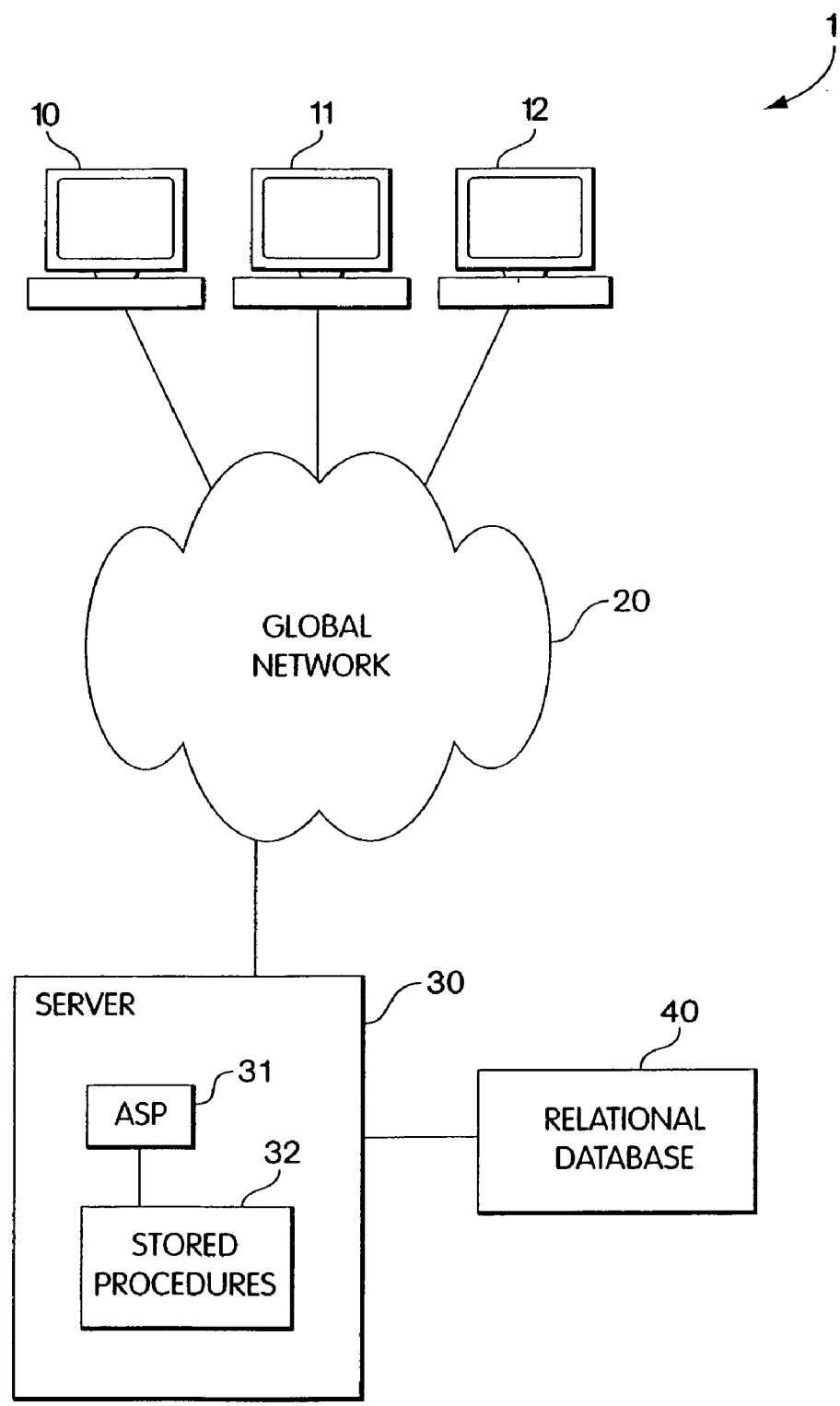
FIG. 1 illustrates a computer system for implementation of an embodiment of the present invention.
Figure 2:
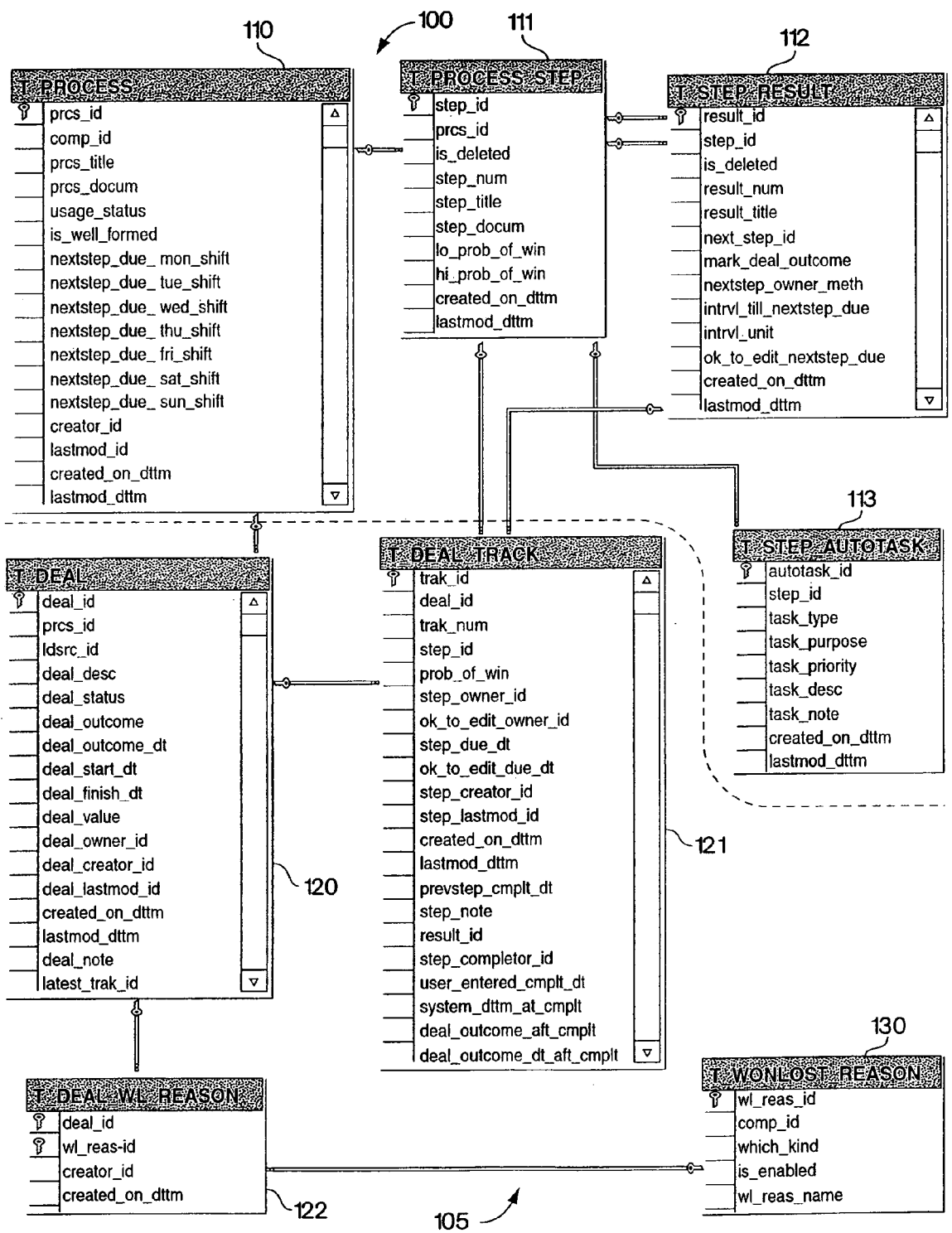
FIG. 2 illustrates the tables for entries for data in a relational database according to an embodiment of the present invention.

As illustrated in FIG. 1, the present invention is a system 1 which provides automated process building, use, and information capture and reporting. The system is remotely accessed through web pages on a global network 20, such as the Internet. User computers 10, 11, 12 are used to access web pages and information stored on a server 30. The system includes software running on the server 30. The software is implemented using Microsoft SQL Server stored procedures 32 for performing the various actions required by the system. The users access the procedures through Active Server Pages (ASP) 31 implemented using VB script. The server accesses a relational database 40, which can be stored in the server or a separate storage device. FIG. 2 illustrates the contents and organization of the relational database 40. Of course, other types of software implementations could be used. For example, the system could be set up for direct access by users in a local area network or a standalone system. The software could be created using other languages or programs, as necessary, depending upon the system upon which it is operating. Additionally, the relational database 40 could include a greater or fewer number of elements or could be organized differently. Those of ordinary skill in the art will easily recognize the manner in which the procedures of the present invention can be implemented in various manners other than the particular described embodiment.

The system of the present invention allows users to create and use processes in conjunction with deals. The system accesses, displays and manipulates data in the relational database 40. The relational database 40, as illustrated in FIG. 2, is separated into two interrelated parts, process data 100 and deal data 105. The process data 100 includes processes 110, steps 111, results 112, and tasks 113. The lines in FIG. 2 illustrate the relationships between entries in different tables. For example, entries in the process step table 111 reference entries in the process table 110. Similarly, entries in the deal table 120 reference the corresponding processes in the process table 110. An administrator (or any person having authority to create or change processes) accesses the system, using a user computer 10, 11, 12, to create, delete or modify the process data 100. A process is defined by a entry in a process table 110 of the relational database 40. The process entry may have the form set forth in FIG. 2 and described in Table 1.

TABLE 1

| Identifier | Description |
| --- | --- |
| Prcs_id | Unique identifier for the process |
| Comp_id | Unique identifier for the company |
| Folder_id | Folder identifier |
| Prcs_title | Title |
| Prcs_docum | Narrative description of process |
| Usage_status | Identifies if process is in use |
| is_well_formed | A flag for well-formed process |
| Lastmod_id | Identification number of last modifier |

TABLE 1-continued

| Identifier | Description |
| --- | --- |
| Creator_id | Creator's identification number |
| Created_on_dttm | Date created |
| Lastmod_dttm | Date last modified |

Of course, other information may be included in the process entry. For example, FIG. 2 illustrates entries to shift the due dates for the next step depending upon the day of the week. Comp_id is used to identify users and their authorization to use or change a process. Folder_id allows for organization of processes in order to allow users or administrators to review certain types or categories of deals. Usage_status can have the values of "under construction", "testing," "active," "inactive," which determine how deals can be created for each process. No deals can be created for "under construction" and "inactive". Only the process owner can create a deal for a "testing" status process. "Active" status allows general use of the process to create deals. Since processes can be dynamically changed after deals have been created using the process, the "inactive" usage relates to processes that are deleted after deals have been created for that process, or for which the administrator wishes to prevent new deals from being created. The process entry 110 can also include a set of user identifiers and the authorizations allowed for those users.

Each process is further defined by a set of steps. The steps are created as entries in a separate table, called the step table 111. Each step corresponds to a specific process. The step entry may have the form set forth in FIG. 2 and described in Table 2.

TABLE 2

| Identifier | Description |
| --- | --- |
| Step_id | Unique identifier for step |
| Prcs_id | Identifier of corresponding process |
| Is_deleted | Flag for deleted steps |
| Step_num | Number of step in process |
| Step_title | Description of step |
| Step_docum | Detailed instructions from the process creator relating to the step for the person tracking the deal |
| Lo_prob_of_win | Projected lowest probability of winning deal if on this step |
| Hi_prob_of_win | Projected highest probability of winning deal if on this step |
| Created_on_dttm | Creation date |
| Lastmod_dttm | Last date on which step (or corresponding results) were modified |

Of course, other information may be included in the step entry. The Is_deleted element is used for dynamic changes to the process. When a process is changed to delete a step that has been used in a deal, the step entry is maintained for reporting purposes and the Is_deleted flag is set.

Each step has several possible results upon completion of a step. The results are stored as entries in a results table 112. The results entries can be of the form of Table 3.

TABLE 3

| Identifier | Description |
| --- | --- |
| Result_id | Unique identifier for result |
| Step_id | Identifier of the step which contains the result |

TABLE 3-continued

| Identifier | Description |
| --- | --- |
| Is_deleted | Flag for deleted result |
| Result_title | Description of result |
| Result_num | Number of result in listing for step |
| Next_step_id | Identifier of step following result |
| Mark_deal_outcome | Record the deal outcome - won or lost |
| Nextstep_owner_method | Code to allow delegation of next step to another user |
| Intrvl_till_nextstep_due | Time until due date for next step |
| Intrvl_unit | Time unit for due date |
| Ok_to_edit_nextstep_due | Allows user to change due date |
| Created_on_dttm | Creation date |
| Lastmod_dttm | Last date on which step (or corresponding results) were modified |

Of course, other information may be included in the result entry. The Nextstep_owner_meth is a code that determines how the owner of the next step is determined. The possible values are "identify owner" for allowing the user to select the owner of the next step at the completion of the current step, "current owner" for selecting the owner of the current step as the owner of the next step, and "deal owner" for selecting the deal owner as the owner of the next step.

Step may also have tasks associated with each step. Tasks are also represented as entries in a table in the relational database. The tasks entries may have the form as illustrated in FIG. 2 and described in Table 4.

TABLE 4

| Identifier | Description |
| --- | --- |
| Autotask_id | Unique identifier for task |
| Step_id | Identifier of the step which contains the task |
| Task_type | Identifies the type of task |
| Task_purpose | Identifies the purpose of the task |
| Task_priority | Sets the order for multiple tasks |
| Task_desc | Description of task |
| Task_note | Notes related to task |
| Created_on_dttm | Creation date |
| Lastmod_dttm | Last date on which task was modified |

Of course, other information may be included in the task entry. Tasks provide a listing for the user of the individual tasks that should be performed as part of a process step.

Figure 3:
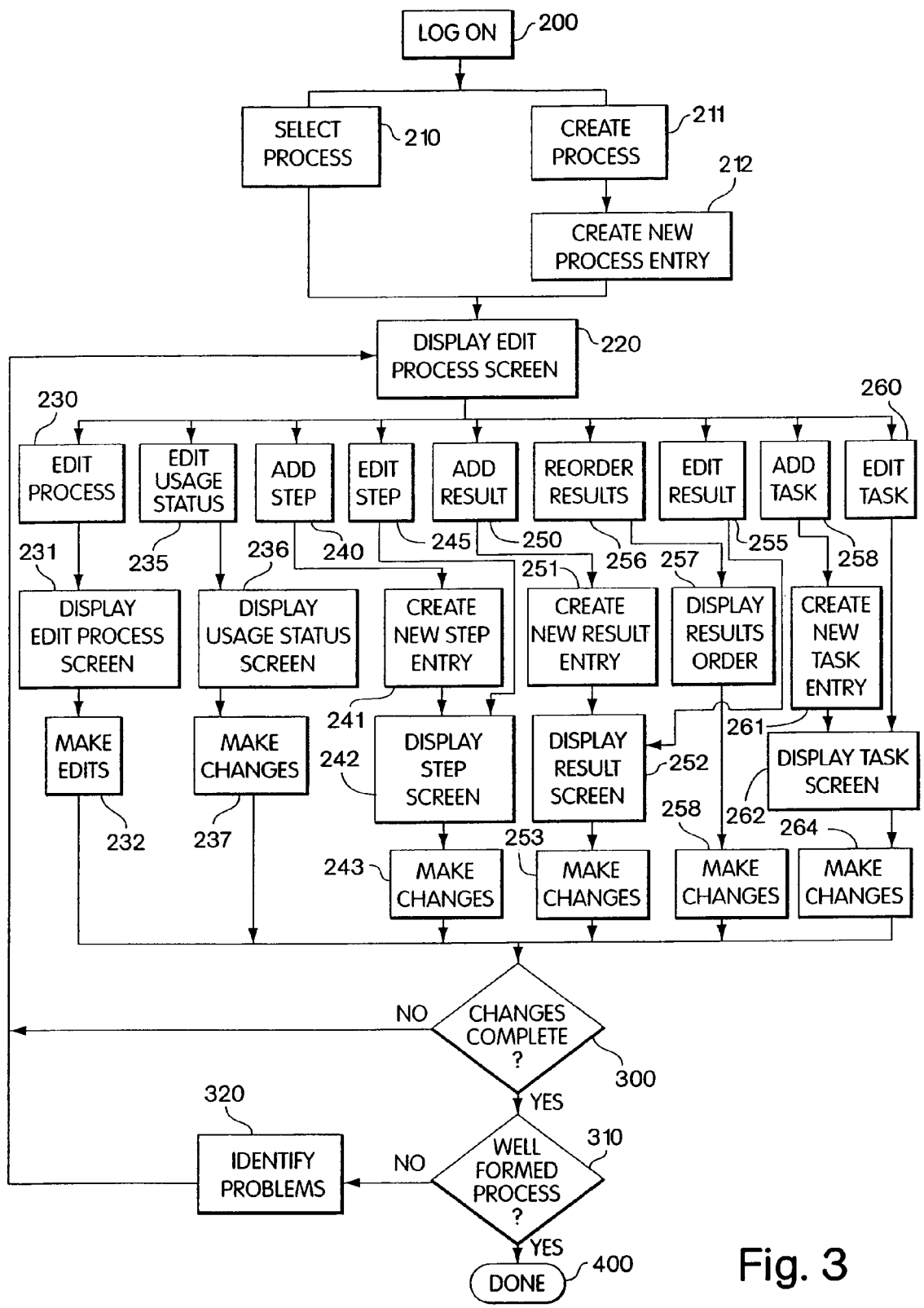
FIG. 3 is a block flow diagram of a procedure for process creation and modification according to an embodiment of the present invention.
Figure 4A:
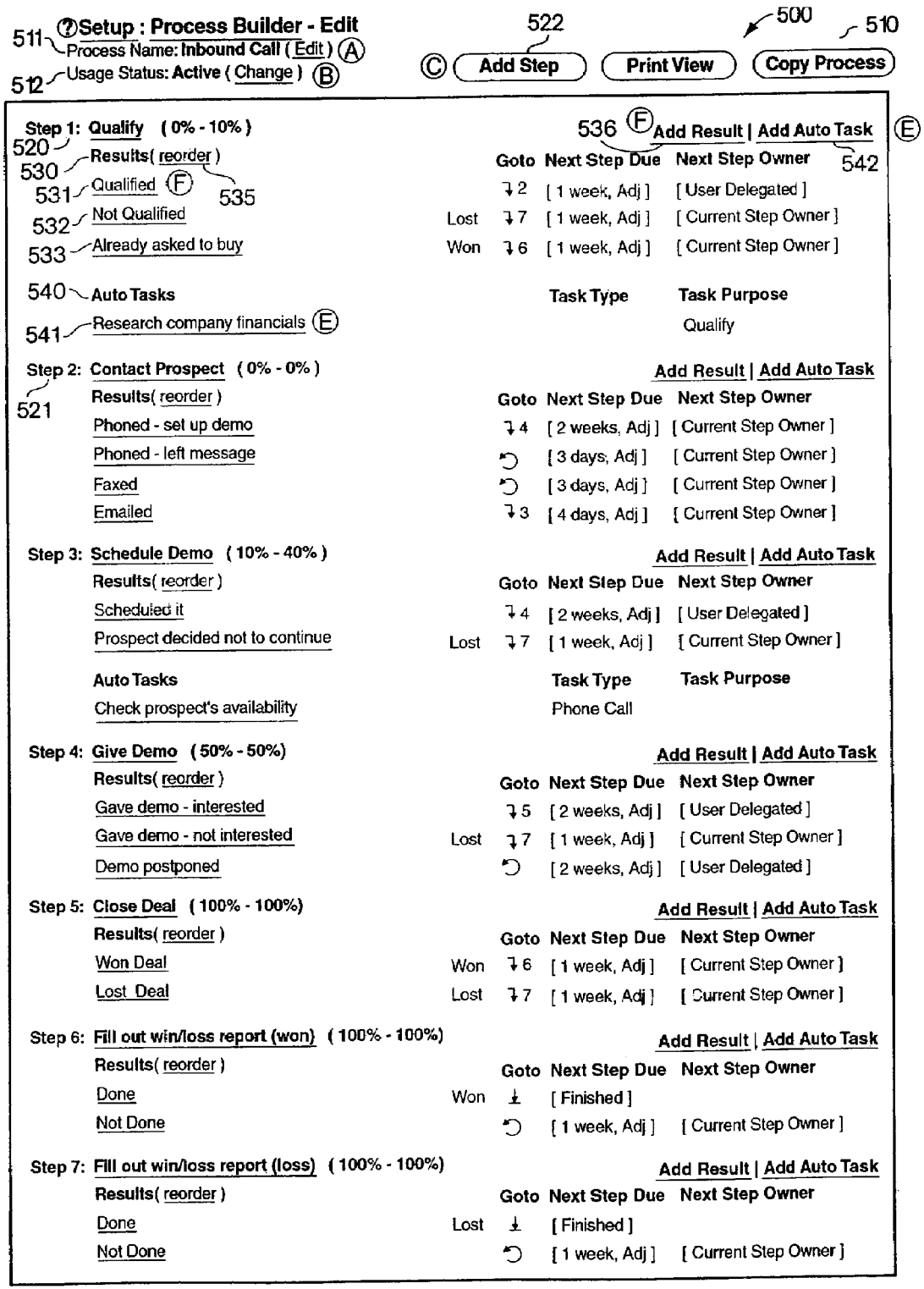

In using the system, an administrator must first create the processes for the organization. The procedure for creation or modification of a process is illustrated by the block flow diagram of FIG. 3. FIGS. 4A-4K illustrate an embodiment of a user interface for performing the process creation or modification procedure. The administrator logs onto the system using the appropriate web page for access (step 200). Administrator logins and passwords control access to the system. The administrator can then review a listing of the processes previously created, visually separated by folders (not shown). The listing will provide on the screen all or a portion of the information in the process table (see Table 1). The administrator can select one of the entries for modification (step 210) or can create a new entry (step 211). Upon creation of a new entry (step 212), a new process identifier is assigned to the process. The administrator then enters the information relating to the process entry in the same manner as for modification of process information, as described below. Once the process entry is created or selected for modification, the information relating to the process in the relational database is displayed (step 220). FIG. 4A illustrates a user interface for display of the information relating to a process. The edit process screen 500 includes the process information 510, step information 520, 521, results information 530-533, and task information 540-541. Of course, if the process has just been created, no information would be displayed until it is created. The system uses internal procedures for collecting the information for the edit process screen 500. The step table 111 is traversed to locate all of the steps having the selected process id. Then, the results table 112 and task table 113 are traversed to locate all results and tasks associated with the step id. The retrieved information is organized based upon the step_num and result_num values in the entries and displayed in the edit process screen 500.

The edit process screen 500 also includes locations for selecting the addition of steps 522, results 536, and tasks 542. The administrator selects an action by selecting locations on the display. Based upon the desired information to be changed a different procedure and corresponding user interface are used.

Figure 4B:
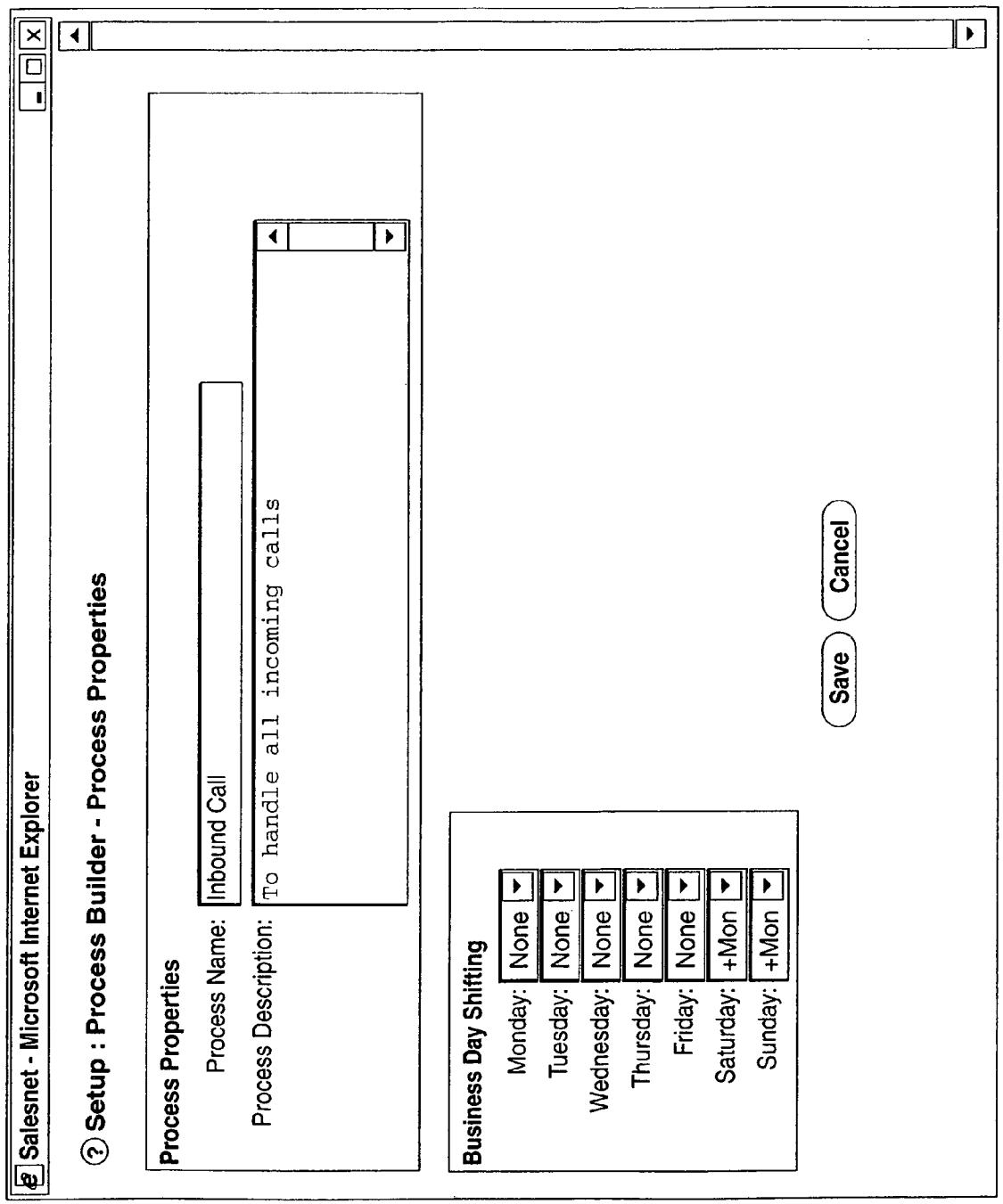
Figure 4C:
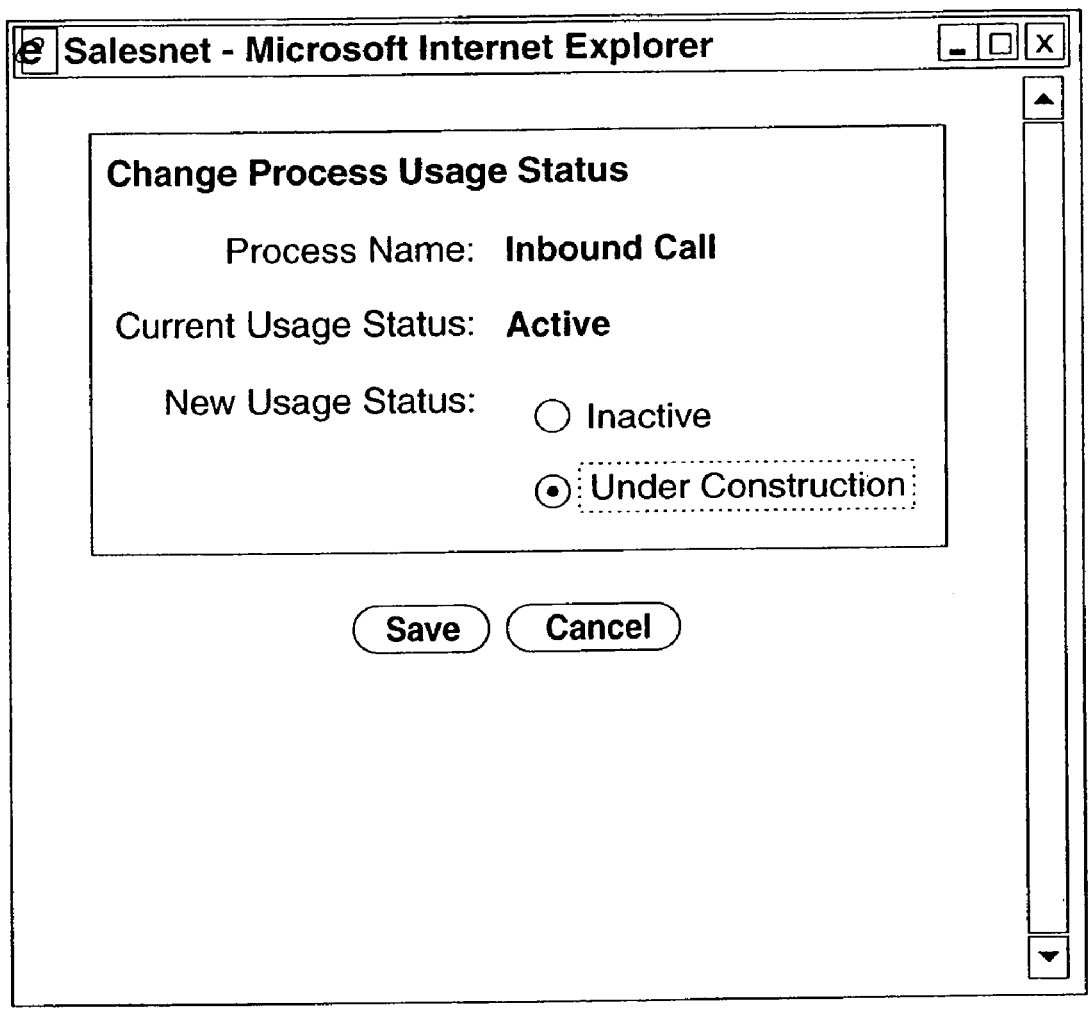
Figure 4D:
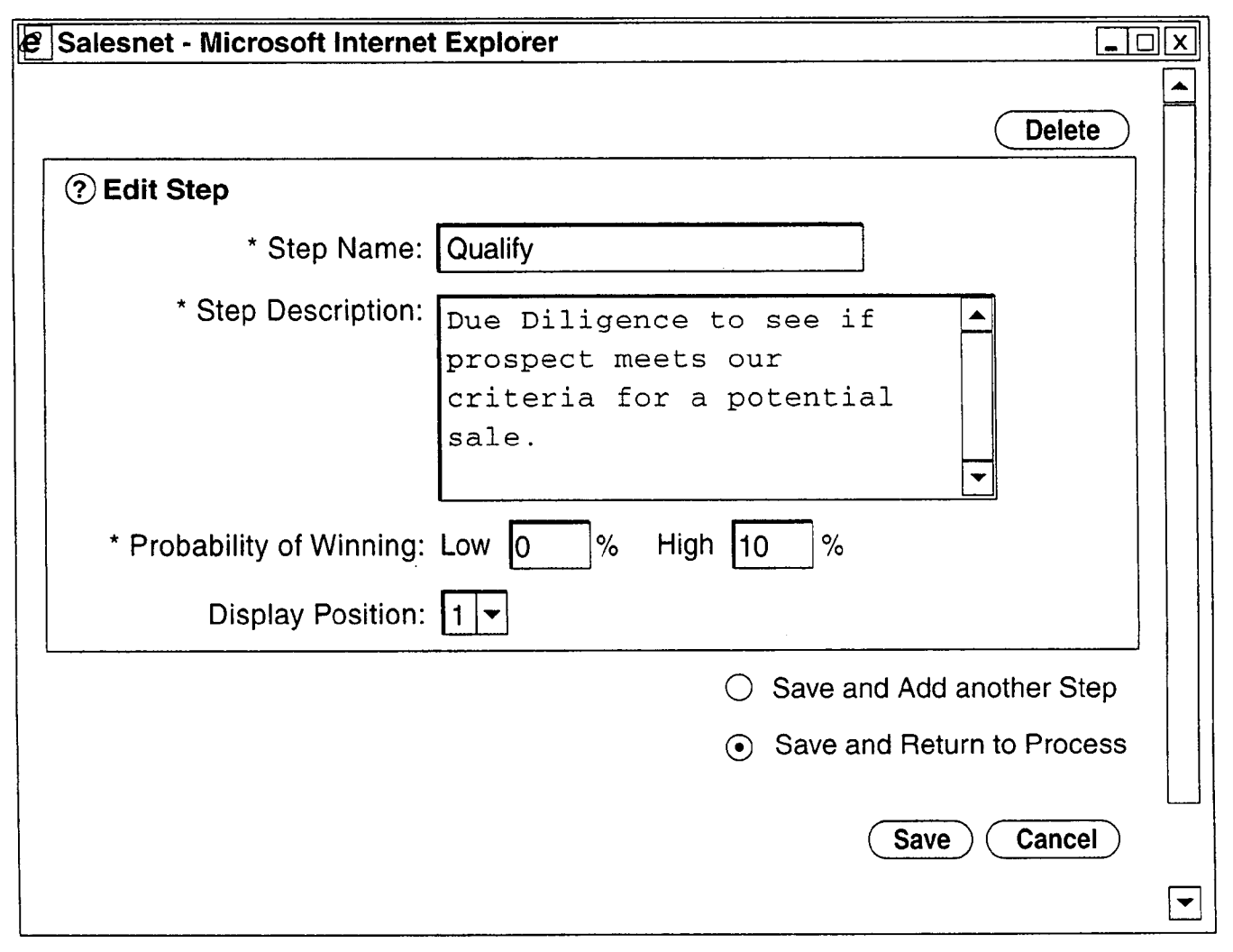
Figure 4E:
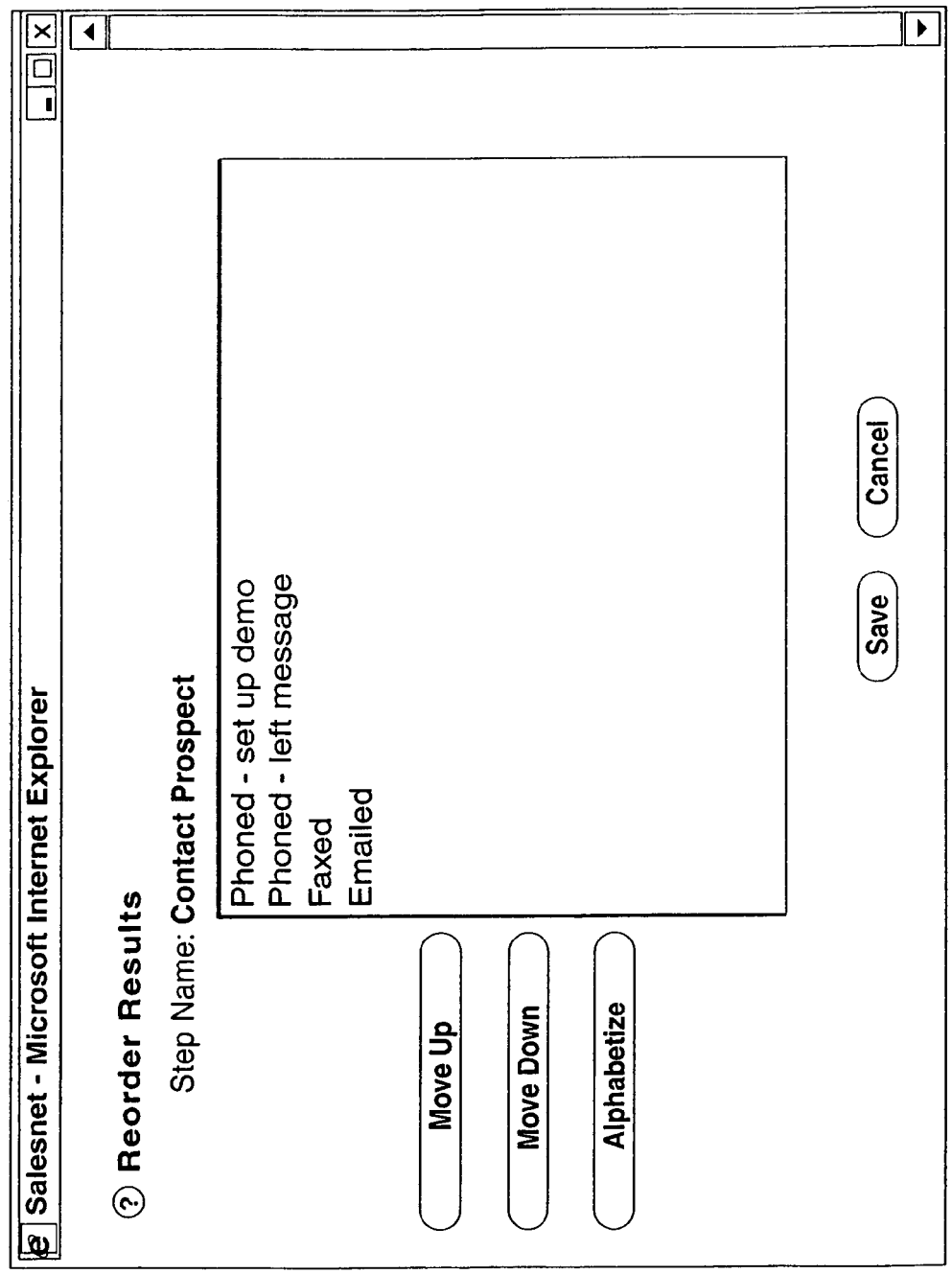

To change general information relating the process (step 230), the administrator selects the "edit" label by the process name 511. The system then displays, at step 231, a screen with the general process information as illustrated in FIG. 4B. The editable data in the process entry is displayed. The administrator can change any of the data in the display, which is then stored in the process entry of the relational database. The administrator is then returned to the edit process screen (FIG. 4A). The usage status for the process is changed (steps 236-237) from a separate screen illustrated in FIG. 4C.

To add steps to the process (step 240), the administrator selects the "Add Step" button 522 in the process display. When a step is added, a new entry is created in the process step table 111 (step 241). A step information screen (FIG. 4D) is displayed for the administrator to input information relating to the step (step 242). Similarly, by selecting an existing step in the edit process screen, the information relating to that step is displayed within the step information screen (FIG. 4D). When the administrator has completed entry or modification of the information for a step, the information is stored in the entry of the step table 112 and the administrator is returned to the edit process screen (FIG. 4A).

Figure 4F:
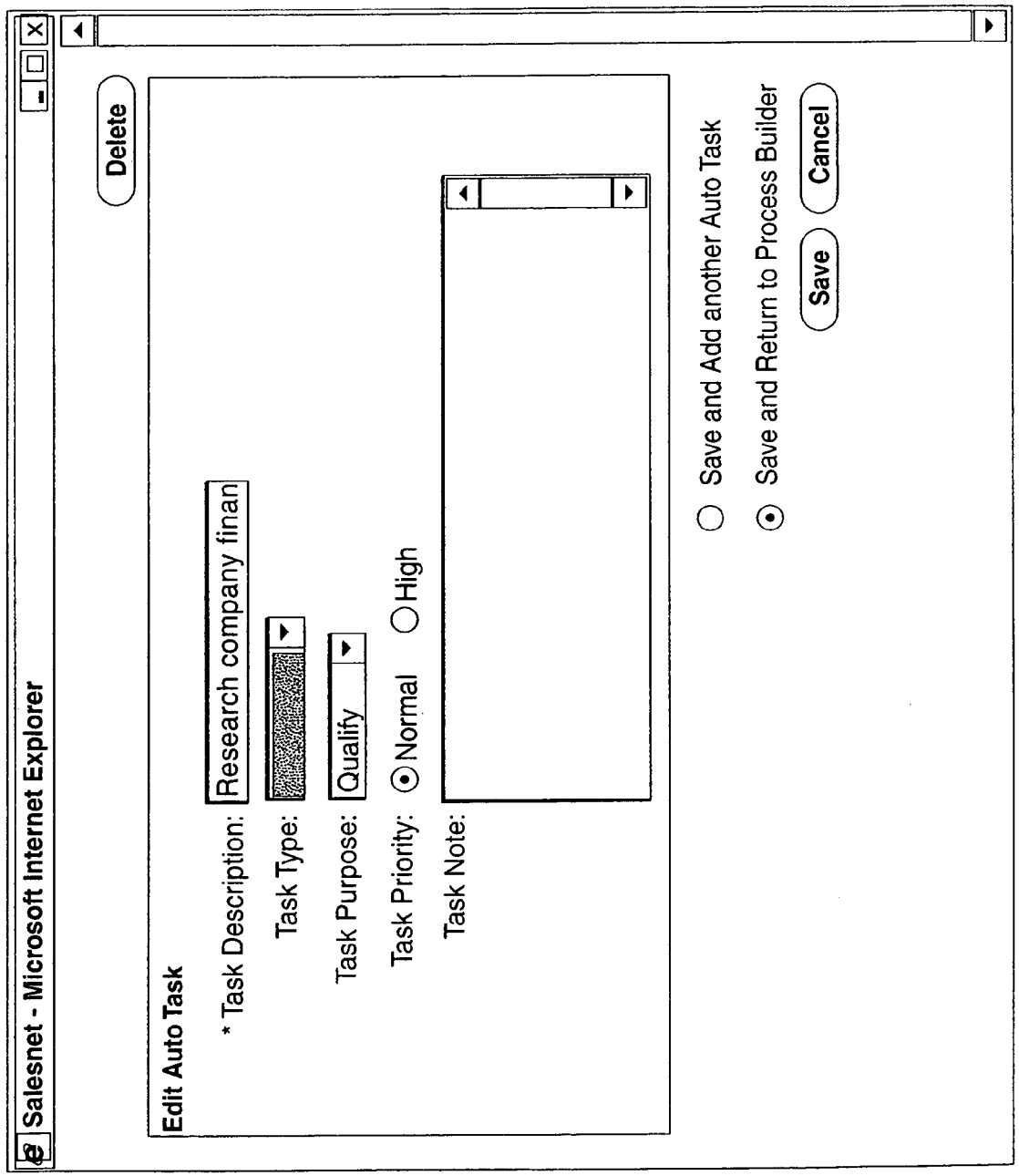
Figure 4I:
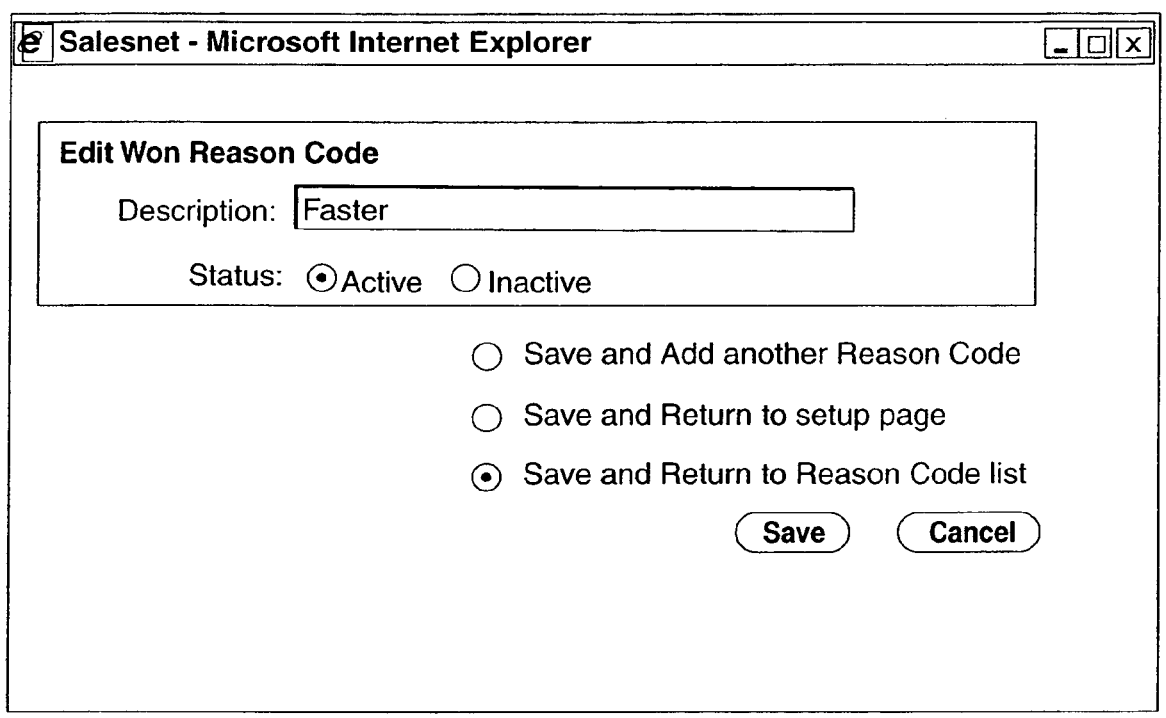

Similarly, to add results to a step, the administrator selects the "Add Result" button 536 on the edit process screen (step 250). A new entry is created in the results table 112, and a result information screen (FIG. 4G) is displayed for entry of result information. When an existing result is selected for modification, the result information screen is also displayed (step 252) with the corresponding information for modification. Additionally, the administrator can change the order in which the possible results for each step are displayed (step 256). To do so, the administrator selects the "reorder" button above the results in the edit process screen (FIG. 4A). The administrator is then taken to a screen (FIG. 4E) for changing the order of the results. The order is stored by means of the result_num field in the results table 112. As noted above, when a deal is won or lost, a reason can be recorded for the outcome. The administrator can create or modify the reason codes which are to be associated with outcomes for all processes in the system. FIGS. 4H and 4I illustrate user interface screens for creation, selection and modification of reason codes for deals won or lost.

Figure 4K:
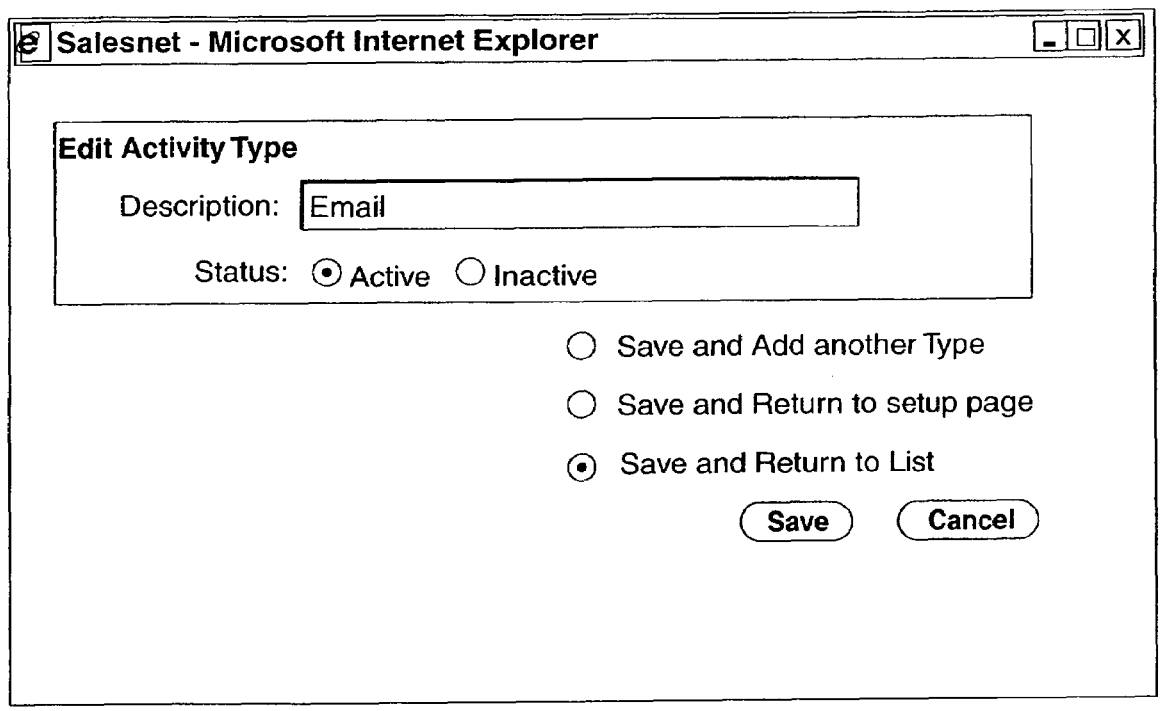

Tasks can also be associated with each step. To create a task (step 260), the administrator selects the "Add Auto Task" button 542 on the edit process screen corresponding to the step. The system creates then a new entry in the task table (step 261). To edit a task, the task is selected. In either case, the task information screen, FIG. 4F, is displayed for entry or modification of task information. As noted above, tasks include a type and purpose. The type and purpose can be created by the administrator for all processes in the system. FIGS. 4J and 4K illustrate user interface screens for creation, selection and modification of information relating to task types and purposes.

Additionally, an administrator can create a new process by copying and modifying an existing process. Upon copying a process, all of the steps and results for the process are copied. This process creates new entries (with correspondingly new identification numbers) for the process, steps and results within the appropriate tables. The administrator can then change the steps or results of the new process using the regular modification procedure.

Figure 5:
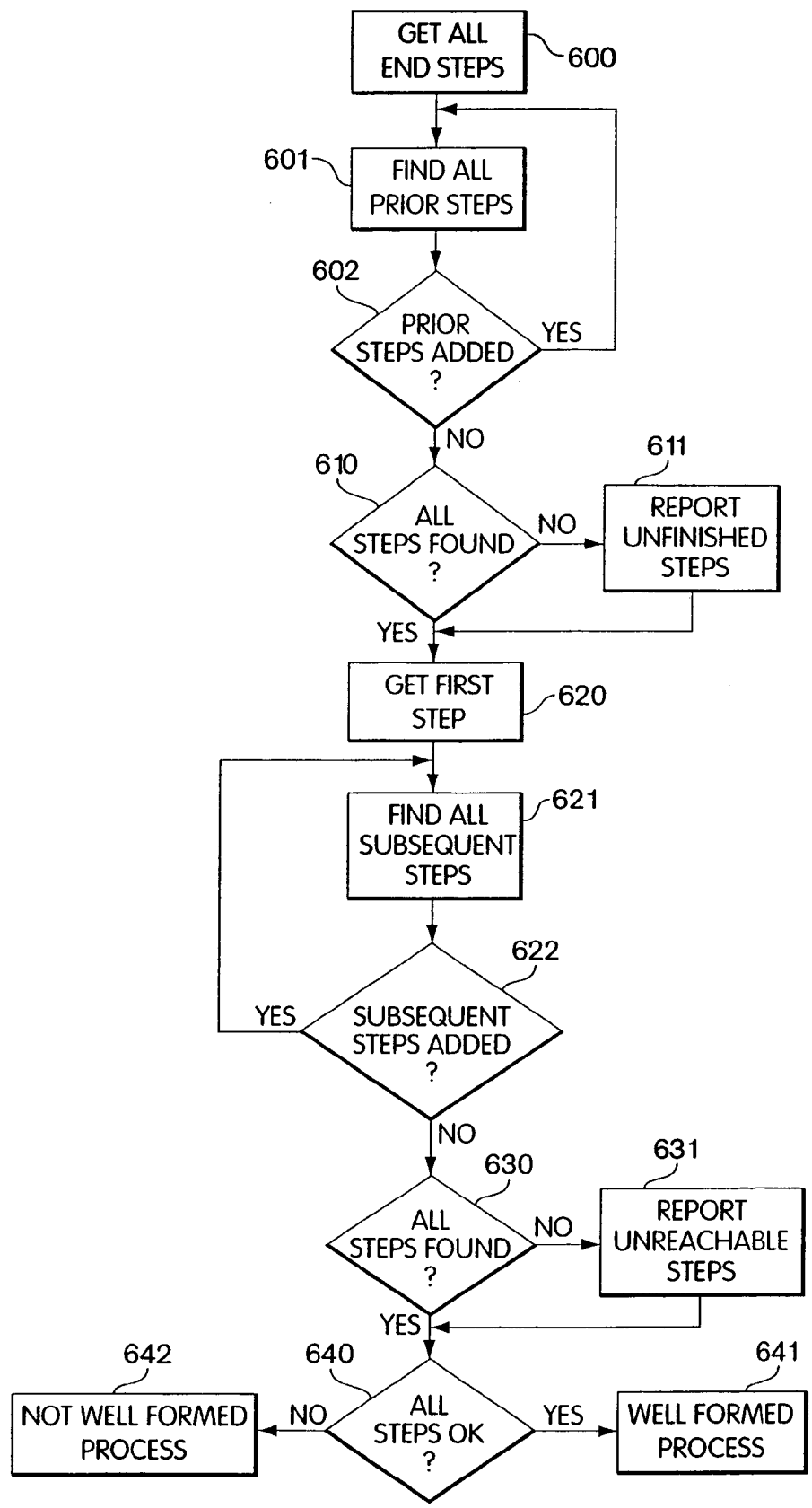
FIG. 5 is a block flow diagram for determining errors in a process.

Once a process is fully created or modified, it is checked to ensure that there are no errors (step 310). A process that is not well-formed, i.e. without errors, cannot have an active usage status. If errors are found, the problems are identified at step 320, and the administrator is returned to the edit process screen to make corrections. The procedure for determining if a process is well-formed is illustrated in FIG. 5. The procedure starts by finding all of the final steps in the process (step 600). The result table is traversed to determine every step that directly precedes any of the final steps (step 601). If preceding steps are found (step 602), the logic is repeated until no more steps are located. Then, the set of located steps are compared to the steps of the process (step 610). If any steps are missing, those steps are "unfinishable", which means that following a set of results from that step will not achieve termination of the process. The error is reported to the administrator (step 611). A similar procedure is used starting with the first step of the process (step 620). All of the directly subsequent steps are located (step 621) until there are no more subsequent steps (step 622). If all of the steps in the process have not been found by the second procedure (step 630), the omitted steps are "unreachable", which means that no result moves the user to that step. Again, any errors are reported to the administrator (step 631). If all of the steps are finishable and reachable, then the process is well formed (step 641). Otherwise, the process is not well formed (step 642) and cannot become active.

Once a process is created, it can be used by a user to track a deal. A deal is tracked by creating or modifying entries in the deal information 105 of the relational database. The users access the system using an appropriate web page. Again, user logins and passwords control access to the system. The user starts by creating a deal corresponding to each sales opportunity. A deal is created by setting up an entry in a deal table 120. A deal entry may have the form of Table 4, and as illustrated in FIG. 2.

TABLE 4

| Identifier | Description |
| --- | --- |
| Deal_id | Unique identifier for the deal |
| Prcs_id | Identifier for corresponding process |
| Deal_lead_id | Identifier for the lead to the deal |
| Deal_desc | Description of the deal |
| Deal_status | Current status of the deal |
| Deal_outcome | Final result of the deal |
| Deal_outcome_dt | Date of deal outcome |
| Deal_start_dt | Date deal started |
| Deal_finish_dt | Deal completion date |
| Deal_value | Estimated value of deal |
| Deal_owner_id | Current owner of deal entry |
| Deal_creator_id | Creator of deal entry |

TABLE 4-continued

| Identifier | Description |
| --- | --- |
| Deal_lastmod_id | Last person to modify deal entry |
| Created_on_dttm | Date created |
| Lastmod_dttm | Date last modified |
| Deal Notes | Notes field |
| Latest_trak_id | Last track for deal |

Of course, other information may be included in the deal entry. Along with a deal entry, entries in a deal track table 121 are created. The deal track table is used to track performance of the process steps performed within every deal. Entries in the deal track table may be of the form of Table 5.

TABLE 5

| Identifier | Description |
| --- | --- |
| Track_id | Unique identifier for the deal track |
| Deal_id | Identifier for corresponding deal |
| Trk_num | Number of track within deal |
| Step_id | Identifier of corresponding step |
| Prob_of_win | Probability of winning deal |
| Step_owner_id | Identifier of step owner |
| OK_to_edit_owner_id | Flag to allow user changes to the deal owner |
| Step_due_dttm | Step due date |
| Ok_to_edit_due_dttm | Flag to allow user changes in due date after creation of step |
| Step_creator_id | Person who created step |
| Step_lastmod_id | Last date step was modified |
| Created_on_dttm | Date deal track was created |
| Lastmod_dttm | Date last modified |
| Prevstep_cmplt_dt | Date previous step was completed |
| Deal Track Notes | Notes field |
| Result_id | Identifier of result |
| Step_completor_id | Identifier of user completing step |
| User_entered_cmplt_dt | Date user enters as step being completed |
| System_dttm_at_complt | Date on system when completion was entered |
| Deal_outcome_aft_cmpl | Code to identify deal outcome |

Of course, other information may be included in the deal track entry. When a deal is first created, one deal track entry is created. The deal track entry includes information regarding the first step of the process corresponding to the deal.

Of course, other information can also be included in separate tables within the relational database. For example, a win/lose reason table 122 can be used to record various reasons that a deal was won or lost. The win/lose table 122 may also reference a reason table 130 created by the administrator for selecting company determined choices for reasons.

Figure 6A:
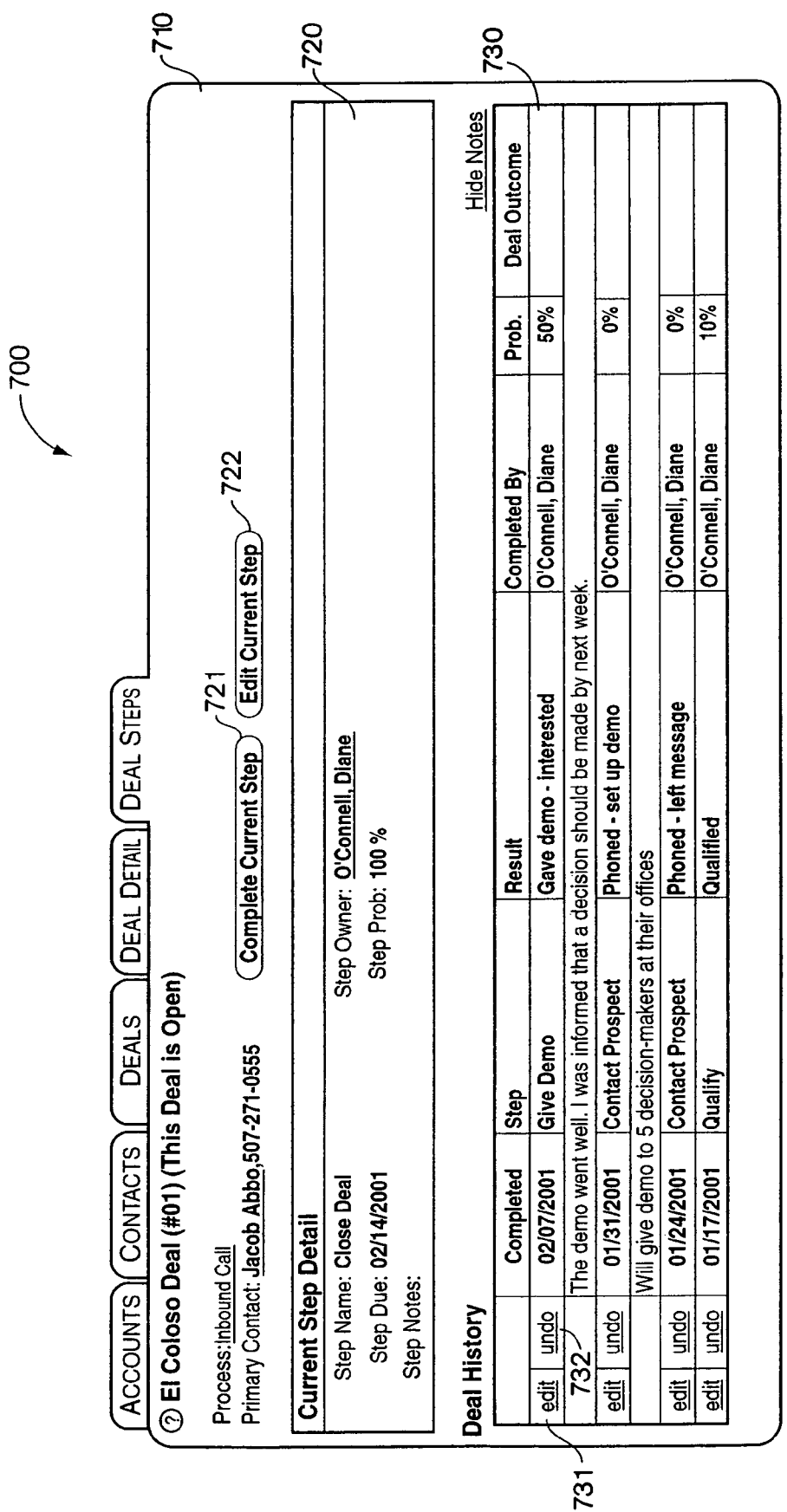
Figure 6C:
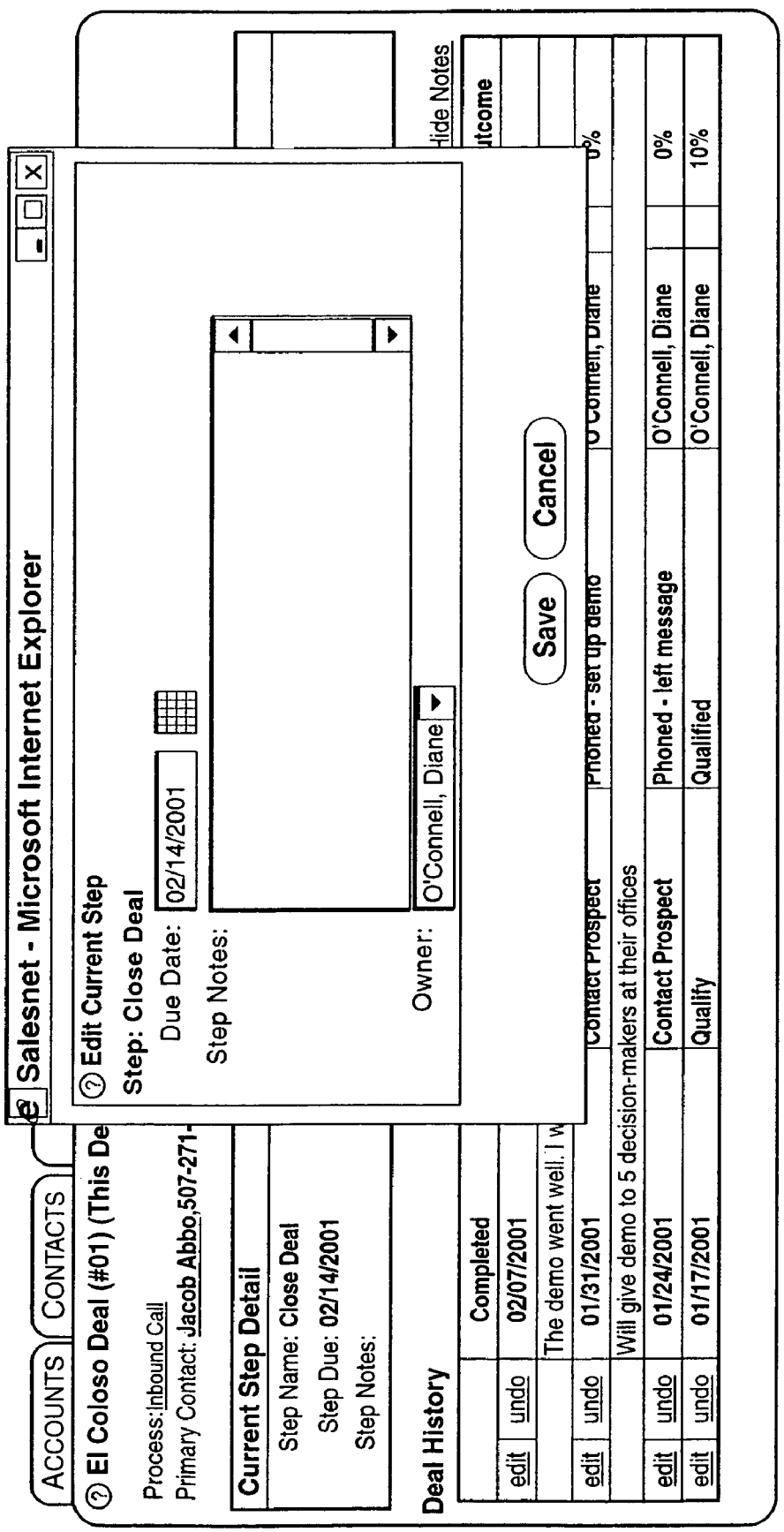
Figure 7:
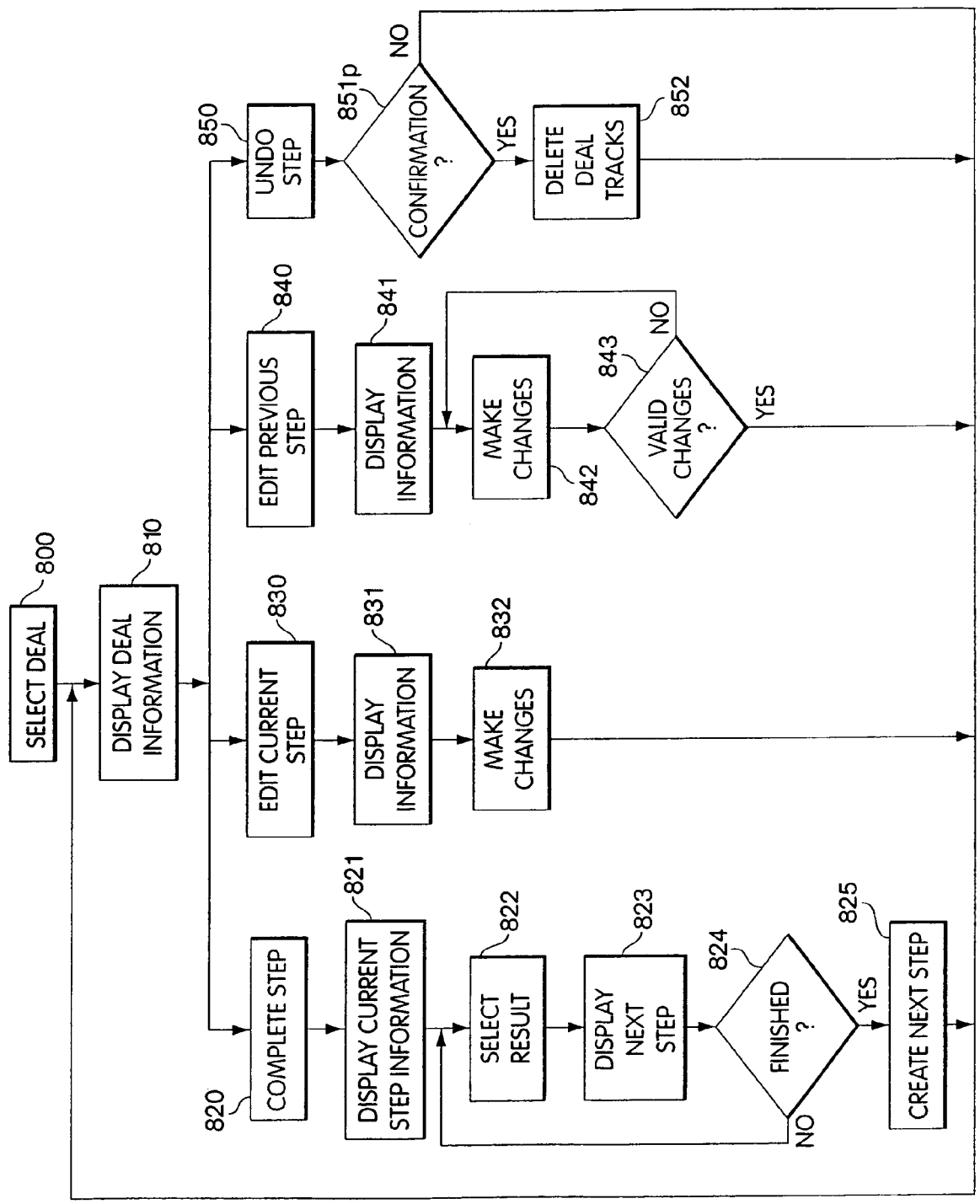
FIG. 7 is a block flow diagram for tracking a deal.

The procedure for tracking a deal is illustrated in FIG. 7. User interfaces utilized in the procedure are illustrated in FIGS. 6A-6D. To track a deal according to a process, the user creates a new deal or selects a previously created deal (step 800). The system provides the user with information relating to the deal, including the current step for that deal (step 810). A deal information display 700 is illustrated in FIG. 6A. The information includes information from the entry in the deal table for the deal 710, such as the process being used. Other information, not in the deal table, related to the deal, such as contact information, may also be recorded and displayed. The deal information display includes the current step 720 and the previously tracked steps 730, which are obtained from the deal track table. The user can select various actions from the deal information display 700. When the user completes the current step, he or she selects the "Complete Current Step"

button (step 820). This generates a step completion display (740, FIG. 6B) for collecting information relating to the step completion. The step completion display includes information relating to the current step 741 and the next step 745. The current step information includes a drop-down menu 742 for the possible results of the step. The results are determined by traversing the results table 112 based upon the step_id. The next step information 745 is based upon the currently selected result. The user can select different results (step 822, FIG. 7) from the drop-down menu 742, which will cause the next step information to change (step 824). When the user has selected a result and entered information, the selected result is inserted in the result_id column of the deal track record. The user who enters the result is recorded at the step_completor_id record. A system requests a completion date that is recorded as user_entered_cmplt_dt and also records the system date at system_dttm_at_cmplt. The user may be asked to input a probability of winning the deal, which is entered at prob_of_win. However, the probability of winning must be within the limits set for the step in the process creation stage. As appropriate, the user will have to enter reasons for the deal outcome corresponding to the mark_deal_outcome element of the results entry, or to delegate the next step to another user, corresponding to the nextstep_owner_method element of the results entry. Additionally, as necessary the deal_outcome element of the deal entry will be updated by the corresponding mark_deal_outcome element in the results entry. The deal status may have the values of "won", "lost" or "unknown". A deal track entry will then be created for the next step to be completed in the process, which becomes the current step. If the selected result terminates the deal, the deal_status record in the deal entry will be set from "open" to "finished", and no new deal track entry will be created.

The user may also edit information relating to the current step (step 830) or a previously completed step (step 840). In either case, the editable information is displayed to allow changes (steps 831, 841). FIG. 6C illustrates a display for editing step information. For previously completed steps, the system ensures that any changes are valid before completing the change. For example, if the completion date is changed to a date before the previous step, the user is asked to select a valid date.

Finally, the user can undo one or more previously completed steps. When a step is undone, the information relating to the result chosen for the step, is removed from the deal track table and so are any/all previously completed steps 121. The user is asked to confirm that the steps are to be undone (step 851; FIG. 6D), before a deletion is made.

The system allows for reporting of any of the recorded information in the tables. An authorized user can search and sort any of the information to create such reports. Therefore, a supervisor can obtain information about the status of deals, the likely outcomes, the expected values and the current or ongoing steps to be performed. The supervisor can also monitor steps performed by specific users or by groups of users.

The system also allows modification of processes which have already been used to track deals, including deletion of steps and results in the process. When an administrator wishes to delete a step, the system checks the deal track table 121 to determine whether any deals have used the step. If no deals have used the step, the entry for that step on the step table 111 may be deleted, as long as the process remains well-formed. A Additionally, all entries in the results table 112 and task table 113 relating to that step need to be deleted. On the other hand, if a step has been used in a deal and is referenced by an entry in the deal track table, removal of the step entry in the step table 111 would cause errors. Therefore, the step is removed by setting the Is_deleted flag for that step entry. The Is_deleted flag causes a logical deletion of the step, while retaining the step information.

Since all processes must be well-formed, the system checks the process before completion of a step deletion, whether by setting the Is_deleted flag or removal of the entry in the step table, to ensure that all active steps are "reachable" and all steps are "finishable". If there is a step that is unreachable or unfinishable, the system requires the administrator to change the process before the selected step can be deleted and the process made active. The system distinguishes between active and inactive steps in the procedure for determining if a process is well-formed. Active steps are ones that have not been logically deleted. All currently existing deals have to be able to be completed. If a deal is currently on a step that is to be deleted, the process needs to accommodate continuation of that deal. Accordingly, the procedure for determining unfinished steps (FIG. 5, steps 600-611) includes all active and inactive steps. A logically deleted step -may be finishable even if the process continues through one or more steps that are also logically deleted. However, a deleted step should not be reachable from the start of the process. Therefore, the procedure for determining unreachable steps (FIG. 5, steps 620-631) only includes active steps. Similarly, results which are referenced in the deal track table cannot be directly deleted, and, thus, have an Is_deleted flag set.

Of course, those of ordinary skill in the art will recognize that adaptations and modifications can be made to the embodiments without departing from the essential characteristics of the present invention. The scope of the invention is not limited by the embodiments disclosed and includes adaptations and modifications.

I claim:

1. A system for managing sales processes comprising:
   a processor; and
   a memory for storing a database including:
      information regarding at least one sales process;
      information regarding a plurality of steps associated with each of the at least one sales process, the plurality of steps having a sequential order;
      information regarding an ability to modify the plurality of steps;
      information regarding at least one result associated with each of the plurality of steps;
   means for creating at least one deal corresponding to the at least one sales process;
   means for indicating completion of steps associated with the at least one sales process corresponding to the at least one deal;
   means for recording at least one modification to a step of the plurality of steps upon a user changing any of the plurality of steps while said at least one deal is in process by said user;
   means for recording at least one modification to one or more steps of said sales process in the at least one sales process if any modification of the plurality of steps occurs; and
   means for indicating a next step to be completed based upon the indicated completion of steps.

2. The system for managing sales processes according to claim 1, further comprising:
   means for indicating one of the at least one result associated with a step indicated as being completed;
   means for maintaining consistent recording of the result associated with the step upon changing any of the plurality of steps; and means for determining the next step to be completed based upon the indicated at least one result.

3. The system for managing sales processes according to claim 2, wherein the next step may be any step in the sequential order of the plurality of steps.

4. The system for managing sales processes according to claim 1, further comprising:
 means for removing an indication that the step has been completed; and
 means for indicating the next step to be completed based upon the removal of the indication of the completed step.

5. The system for managing sales processes according to claim 1, further comprising means for storing information regarding completion of steps.

6. The system for managing sales processes according to claim 1, further comprising:
 means for changing information regarding at least one of the plurality of steps; and
 means for ensuring that each process associated with a change of information to at least one of the plurality of steps is complete.

7. A system for managing sales processes comprising:
 a processor; and
 a memory for storing a database including:
  data information regarding at least one sales process;
  data information regarding a plurality of steps associated with each of the at least one sales process, the plurality of steps having a sequential order;
  data information regarding an ability to modify the plurality of steps;
  data information regarding at least one result associated with each of the plurality of steps;
 means for creating at least one deal corresponding to the at least one sales process;
 means for indicating completion of steps associated with the at least one sales process corresponding to the at least one deal;
 means for recording at least one modification to a step of the plurality of steps upon a user changing any of the plurality of steps while said at least one deal is in process by said user;
 means for recording at least one modification to one or more steps of said sales process in the at least one sales process if any modification of the plurality of steps occurs; and
 means for indicating a next step to be completed based upon the indicated completion of steps, wherein the next step may be any step in the plurality of steps.

8. The system for managing sales processes according to claim 7, further comprising means for configuring the next step to be completed based upon the indicated completion of steps.

9. A system for managing sales processes comprising:
 a processor; and
 a memory for storing a database including:
  data information regarding at least one sales process;
  data information regarding a plurality of steps associated with each of the at least one sales process, the plurality of steps having a sequential order;
  data information regarding an ability to modify the plurality of steps;
  data information regarding at least one result associated with each of the plurality of steps;
 means for creating at least one deal corresponding to the at least one sales process;
 means for indicating completion of steps associated with the at least one sales process corresponding to the at least one deal;
 means for recording at least one modification to a step of the plurality of steps upon a user changing any of the plurality of steps while said at least one deal is in process by said user;
 means for recording at least one modification to one or more steps of said sales process in the at least one sales process if any modification of the plurality of steps occurs; and
 means for indicating a next step to be completed based upon the indicated completion of steps,
 means for determining the next step to be completed based upon the indicated at least one result, wherein the next step may be any step in the sequential order of the plurality of steps;
 means for removing an indication that the step has been completed; and
 means for indicating the next step to be completed based upon the removal of the indication of the completed step.

* * * * *